United States Patent [19]

Soui

[11] Patent Number: 5,786,074
[45] Date of Patent: Jul. 28, 1998

[54] MAGNETIC RECORDING MEDIUM

[75] Inventor: Tadashi Soui, Osaka, Japan

[73] Assignee: Hitachi Maxell, Ltd., Osaka, Japan

[21] Appl. No.: 655,927

[22] Filed: May 31, 1996

Related U.S. Application Data

[63] Continuation of Ser. No. 372,996, Jan. 17, 1995, abandoned.

[30] Foreign Application Priority Data

Jan. 18, 1994 [JP] Japan ................................. 6-018998

[51] Int. Cl.$^6$ ................................. G11B 05/71
[52] U.S. Cl. .............. 428/323; 428/328; 428/341; 428/536; 428/694 BP; 428/900
[58] Field of Search ................. 428/323, 328, 428/341, 536, 694 BP, 900

[56] References Cited

U.S. PATENT DOCUMENTS

| | | | |
|---|---|---|---|
| 4,354,213 | 10/1982 | Martinelli | 360/133 |
| 4,647,502 | 3/1987 | Miyake et al. | 428/323 |
| 4,696,869 | 9/1987 | Funahashi et al. | 428/695 |
| 4,709,816 | 12/1987 | Matsumoto et al. | 206/444 |
| 4,797,321 | 1/1989 | Funahashi et al. | 428/328 |
| 4,820,565 | 4/1989 | Funahashi et al. | 428/64 |
| 5,051,319 | 9/1991 | Kuse et al. | 428/694 |
| 5,126,215 | 6/1992 | Aonuma et al. | 428/694 |
| 5,433,989 | 7/1995 | Hanai | 428/141 |
| 5,587,860 | 12/1996 | Umebayashi et al. | 360/133 |

*Primary Examiner*—Stevan A. Resan
*Attorney, Agent, or Firm*—Birch, Stewart Kolasch & Birch, LLP

[57] ABSTRACT

A magnetic recording medium having excellent reliability with minimum drop-out including a support film and a magnetic layer containing magnetic powder particles dispersed in a binder resin and a lubricant having a total extract content of from 10 to 100 mg/m$^2$ and a content at the surface of the magnetic layer not larger than 1.0 mg/m$^2$.

6 Claims, No Drawings

MAGNETIC RECORDING MEDIUM

This application is a continuation of application Ser. No. 08/372.996 filed on Jan. 17, 1995, now abandoned.

BACKGROUND OF THE INVENTION

1. Field of the Invention

The present invention relates to a magnetic recording medium, and more specifically, to a magnetic recording tape or a magnetic recording disk which exhibits less drop out of the signal.

2. Discussion of Related Art

In general, a magnetic recording medium, produced by applying a magnetic paint containing a dispersed magnetic powder in an organic binder resin on a substrate and drying the magnetic paint to form a magnetic layer, sometimes experiences error in the drop-out of signals. Preventing the drop-out of signals is very important to provide a highly reliable magnetic recording media. The drop-out of signal is caused by the adhesion of foreign material to the surface of the magnetic layer or by damage to the magnetic layer.

The damage of the magnetic layer is usually caused by friction between the magnetic layer and a magnetic head in writing or reading the signal. To prevent the damage to the magnetic layer, it is known that a lubricant layer is provided between the magnetic layer and the magnetic head by applying a lubricant, such as a fatty acid or fatty acid ester, to the surface of the magnetic layer to reduce the friction. To form a lubricant layer between the magnetic layer and the magnetic head, the lubricant has to be in a liquid state within the temperature range in which the magnetic recording medium is used. Since foreign material, such as dust, on the surface of the magnetic layer or magnetic head is moistened by the liquid lubricant, the foreign material readily adheres to the magnetic layer thus damaging the magnetic layer. The size of defect, damage or amount of foreign material on the magnetic layer, which effects drop-out, must be reduced as the recording density increases. Therefore, prevention of drop-out caused by damage or adhesion of foreign material on the surface of the magnetic layer has been very difficult to achieve.

SUMMARY OF THE INVENTION

Therefore, it is an object of the present invention to provide a novel reliable magnetic recording medium which will overcome the above-noted disadvantages.

A further object of the present invention is to provide a novel magnetic recording medium having excellent reliability with minimum of drop-out.

In order to overcome the disadvantages of the conventional magnetic recording medium, the present invention provides a magnetic recording medium having a support film and a magnetic layer comprising magnetic powder particles dispersed in a binder resin and a lubricant having a total extract content of from 10 to 100 mg/m², wherein content in the surface area of the magnetic layer is no greater than 1.0 mg/M². These properties prevent the adhesion of foreign material to the surface of the magnetic layer and subsequent damage of the magnetic layer so as to reduce the drop-out of signal.

DETAILED DISCUSSION OF THE INVENTION

Further scope of applicability of the present invention will become apparent from the detailed description given hereinafter. However, it should be understood that the detailed description and specific examples, while indicating preferred embodiment of the invention, are given by way of illustration only, since various changes and modifications within the spirit and scope of the invention will become apparent to those skilled in the art from this detailed description.

In the present invention, it has been determined that a magnetic recording medium having excellent reliability, with minimal drop-out, including a support film and a magnetic layer comprising magnetic powder particles dispersed in a binder resin and a lubricant having a total extract content of from 10 to 100 mg/m² with content in the surface area of the magnetic layer being no greater than 1.0 mg/m². The magnetic recording medium characterized by the present invention prevents moistening of any foreign material present on the surface of the magnetic layer or magnetic head by a liquid lubricant and subsequent adherence to the magnetic layer, thereby producing less drop-out of signals even when information is recorded at a high density.

In the present invention, the content of the lubricant in a surface area of the magnetic layer is measured by Electron Spectroscopy for Chemical Analysis (ESCA) including the steps of measuring the K orbit photoelectron spectrum of carbon atoms of the lubricant and measuring the K orbit photoelectron spectrum of carbon atoms of the magnetic layer before and after washing the magnetic medium in a normal hexane. The ESCA analysis including these steps measures the content of the lubricant from the surface of the magnetic layer to a depth of about 0.01 µm from the surface.

The total extract content of the lubricant is measured by the difference between the initial weight which is measured after drying and the final weight which is measured after washing of the magnetic recording medium in a normal hexane, which is used as the solvent of the magnetic layer bath.

In the present invention, the lubricant may be any one of suitable conventional lubricants and may be used independently or in combination with other lubricants. Fatty acid and fatty acid esters are some of the more preferred lubricants.

A method for controlling the content of lubricant in the surface area of the magnetic layer may be controlling the drying condition of the magnetic paint on the support film, maintaining the heat treatment temperature of the magnetic recording film low and performing a surface cleaning by pressing the surface into a nonwoven fabric, which is accomplished after the forming of the magnetic layer.

Solid lubricants which do not form a lubricant layer, such as carbon black, graphite, or molybdenum disulfate, are not applicable to the present invention; however, a solid lubricant may be used in combination with a lubricant which does satisfy the requirements of the present invention in order to reduce the friction between the magnetic recording medium and the magnetic head or for some other purpose.

The magnetic layer is produced by applying a magnetic paint containing the magnetic powder dispersed in an organic binder resin, the organic solvent, other necessary additives, such as an abrasive material, antistatic agent, and/or dispersant, on the support film, drying the magnetic paint and applying necessary treatments, such as a heat treatment, if necessary, to form the magnetic layer. Any suitable method may be used to form the magnetic recording medium.

The magnetic layer may be formed on one surface or both surfaces of the support film. The content of the lubricant in the surface area of the magnetic layer and the total extract content of the lubricant should be adjusted in each magnetic layer.

3

As the magnetic powder, any suitable magnetic powder may be used. Specific examples of magnetic powders are metal oxide magnetic powder (e.g. $\gamma\text{-}Fe_2O_3$, $Fe_3O_4$, cobalt-containing $\gamma\text{-}Fe_2O_3$, cobalt-containing $Fe_3O_4$ and $CrO_2$), plate form ferrite magnetic powder (e.g. barium ferrite) and metallic powder (e.g. iron, cobalt and iron-nickel alloy).

In the present invention, in the magnetic layer, any suitable binder resin may be used for the production of the magnetic recording media alone or in combination. Examples of binder resins are cellulose resin, vinyl chloride-vinyl acetate copolymer, polyurethane resin, polyester resin, polyacrylic resin, phenol resin, amino resin, isocyanate compound, radiation curing resin and the like. A resin which has less adhesiveness, such as nitrocellulose, is preferred. In addition to the binder resin(s), any suitable additive, such as an isocyanate crosslinking agent, may be added to the magnetic layer.

In the magnetic paint, any suitable organic solvent may be used alone or in combination. Examples of organic solvents are methyl isobutyl ketone, methyl ethyl ketone, cyclohexanone, toluene, benzene, ethyl acetate, butyl acetate, tetrahydrofuran, dimethylformamide, and the like.

For controlling the content of the lubricant in the surface area, it is preferred to use a solvent having a high boiling point, such as cyclohexanone, when the content of lubricant in the surface area is controlled by the drying conditions during the coating process.

When necessary, additives which have a high Moh's hardness, such as $\alpha\text{-}Al_2O_3$ or $Cr_2O_3$, may be added to the magnetic paint. The additive content in the magnetic paint is preferably more than 5% by weight based on the weight of magnetic powder therein, and most preferably from 5 to 15% by weight based on the weight of magnetic powder therein.

The magnetic layer is produced by applying the magnetic paint containing the magnetic powder dispersed in the organic binder resin and the organic solvent on the substrate and drying the magnetic paint to form the magnetic layer.

PREFERRED EMBODIMENTS

The present invention will be illustrated by following Examples, in which parts and percentages are by weight unless otherwise indicated.

EXAMPLE 1

The following components are well kneaded and dispersed in a sand grinder mill for 2 hours to get a magnetic paint:

| COMPONENT | PARTS |
| --- | --- |
| Cobalt-containing $\gamma\text{-}Fe_2O_3$ magnetic powder (BET specific surface area of 17 $m^2/g$, Coercive force of 700 Oe) | 100 |
| Nitrocellulose (HA-103 manufactured by Asahicasei) | 13 |
| Polyurethane resin (N-2309 manufactured by Nihon polyurethane industry) | 8 |
| Trifunctional isocyanate crosslinking agent | 8 |
| Carbon black (average particle size of 0.03 μm) | 15 |
| $\alpha\text{-}Al_2O_3$ powder (average particle size of 0.4 μm) | 10 |
| Lubricant (Oleyl oleate) | 10 |
| Cyclohexanone | 200 |
| Toluene | 200 |

The magnetic paint is coated on both surfaces of a support film made of polyethylene terephthalate having a thickness of 75 μm and dried, followed by calendering to form the magnetic layers having a thickness of 1.0 μm on each surface.

Next, this magnetic recording media is cut to a doughnut shaped disk to a diameter of 86 mm and its surfaces are polished.

At the end, the magnetic recording media is to be cleaned by pressing the surfaces against a nonwoven fabric at 60 rpm for 120 secs. in order to adjust the content of the lubricant (Oleyl oleate) in surface area to 0.8 $mg/m^2$ for both surfaces.

EXAMPLE 2

In the same manner as in Example 1, the magnetic recording media is produced except that the magnetic recording media is followed by the cleaning to adjust the content of the lubricant (Oleyl oleate) in the surface area to 0.3 $mg/m^2$ for both surfaces.

EXAMPLE 3

In the same manner as in Example 1, the magnetic recording media is produced except that 5 parts of the lubricant (Oleyl oleate) is added to the mixture and the magnetic recording media is to be cleaned by pressing the surfaces against nonwoven fabric at 60 rpm for 30 seconds.

EXAMPLE 4

In the same manner as in Example 1, the magnetic recording media is produced except that 10 parts of the stearic acid normal butyl is added to the mixture in place of the Oleyl oleate.

EXAMPLE 5

In the same manner as in Example 1, the magnetic recording media except that 13 parts of polyurethane resin is added to the mixture in place of nitrocellulose.

EXAMPLE 6

In the same manner as in Example 1, the magnetic recording media is produced except that 13 parts of polyurethane resin, UR-8310 manufactured by Touyoubouseki, is added to the mixture in place of nitrocellulose.

COMPARATIVE EXAMPLE 1

In the same manner as in Example 1, the magnetic recording media is produced with the exception that cleaning of the magnetic recording media is for 90 secs. which adjusts the content of lubricant (Oleyl oleate) in the surface area to 1.2 $mg/m^2$ for both surfaces.

COMPARATIVE EXAMPLE 2

In the same manner as in Example 1, the magnetic recording media is produced with the exception that cleaning of the magnetic recording media is for 50 secs. which adjusts the content of lubricant (Oleyl oleate) in the surface area to 1.7 $mg/m^2$ for both surfaces.

COMPARATIVE EXAMPLE 3

In the same manner as in Example 1, the magnetic recording media is produced with the exception that one part of the lubricant (Oleyl oleate) is added to the mixture, and cleaning of the surfaces of the magnetic recording media is at 1000 rpm for one sec. which adjusts the contents of the lubricant (Oleyl oleate) in surface area to 0.8 $mg/m^2$ for both surfaces.

COMPARATIVE EXAMPLE 4

In the same manner as in Example 1, the magnetic recording media is produced except that 15 parts of the lubricant (Oleyl oleate) is added to the mixture.

The total content of the lubricant, and content in a surface area of the magnetic layer of each of the magnetic recording medium produced in the Examples and Comparative Examples are estimated by ESCA analysis of lubricant extracted from the magnetic layer by normal hexane.

Drop-out was estimated by counting the number of drop-out signals which continued at least 5 μs during 30 minutes of input and output signals after certifying the maximum linear recording density of 14.2 kfci, slice level 70% confirming freedom of initial drop-out, sliding the magnetic medium in contact with a magnetic head for 4 hours at a temperature of 60° C., dust environmental standards class 2,000,000, certifying again by 3.5 inch floppy disk drive YD-686C manufactured by Y. E. DATA.

The results are shown in Table 1. Content of the lubricant in the surface area is in an amount of lubricant existing in a specific surface area of the magnetic layer. Total content of the lubricant is the total amount of lubricant extracted from the magnetic layer by normal hexane, each content representing the average of both surfaces and the number of drop-out being the total number of drop-out counted in both surfaces.

TABLE 1

|  | Content of lubricant in surface area (mg/m) | Total content of lubricant (mg/m) | Number of drop-out (the number) |
|---|---|---|---|
| Example 1 | 0.8 | 88 | 2 |
| Example 2 | 0.3 | 84 | 0 |
| Example 3 | 0.8 | 41 | 1 |
| Example 4 | 0.8 | 80 | 1 |
| Example 5 | 0.8 | 90 | 3 |
| Example 6 | 0.8 | 86 | 3 |
| Comparative Example 1 | 1.2 | 91 | 8 |
| Comparative Example 2 | 1.7 | 90 | 16 |
| Comparative Example 3 | 0.8 | 8 | 40 |
| Comparative Example 4 | 2.0 | 138 | 28 |

From the results of Table 1, it is understood that excellent reliability with minimum drop-out is achieved by a magnetic recording medium including a support film and a magnetic layer containing magnetic powder particles dispersed in a binder resin and a lubricant having a total extract content of from 10 to 100 mg/r$^2$ and a content in a surface area of the magnetic layer not larger than 1.0 mg/m$^2$ The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A magnetic recording medium including a support film and a magnetic layer comprising magnetic powder particles dispersed in a binder resin and a lubricant, wherein total extract content of said lubricant in said magnetic layer is from 10 to 100 mg/m$^2$ while the content of said lubricant at the surface of said magnetic layer is not greater than 1.0 mg/m$^2$ as measured by ESCA including measuring C1s photoelectron spectrum of said lubricant and C1s photoelectron spectrum of said magnetic layer before and after washing a surface of said magnetic layer by normal hexane.

2. The magnetic recording medium according to claim 1, wherein said lubricant is selected from at least one member of the group consisting of fatty acids and fatty acid esters.

3. The magnetic recording medium according to claim 1, wherein said binder resin comprises nitrocellulose.

4. The magnetic recording medium according to claim 1, wherein said magnetic layer further includes additives having a high Moh's hardness being selected from at least one member of the group consisting of α Al$_2$O$_3$ and Cr$_2$O$_3$.

5. The magnetic recording medium as in claim 4, wherein said additive is present in an amount of more than 5% by weight based on the weight of the magnetic powder.

6. A magnetic recording medium including a support film and a magnetic layer comprising magnetic powder particles dispersed in a binder resin and a lubricant, wherein total extract content of said lubricant in said magnetic layer is from 10 to 100 mg/m$^2$ while the content of said lubricant at the surface of said magnetic layer is not greater than 1.0 mg/m$^2$ as measured by ESCA including measuring C1s photoelectron spectrum of said lubricant and C1s photoelectron spectrum of said magnetic layer before and after washing a surface of said magnetic layer by normal hexane, wherein said lubricant is Oleyl oleate.

* * * * *